Aug. 1, 1961         G. T. STOLL                2,994,796
                   SINGLE PHASE MOTOR
Filed Jan. 23, 1958                          2 Sheets-Sheet 1

INVENTOR
Gottlieb T. Stoll
BY
ATTORNEYS

Aug. 1, 1961  G. T. STOLL  2,994,796
SINGLE PHASE MOTOR
Filed Jan. 23, 1958  2 Sheets-Sheet 2

INVENTOR
Gottlieb T. Stoll

BY *Jerome E. Bauer*
ATTORNEYS

2,994,796
SINGLE PHASE MOTOR

Gottlieb Theodor Stoll, Esslingen (Neckar), Germany, assignor to Curt Stoll K.G. Maschinen u. Apparatebau, Neidlingen, Teck, Germany
Filed Jan. 23, 1958, Ser. No. 710,753
Claims priority, application Germany Feb. 8, 1957
7 Claims. (Cl. 310—172)

This invention relates to single-phase alternating current induction motors, and more particularly to an improved stator construction which facilitates the start of the rotor in an induction motor of the shaded pole type.

As is known, a single phase induction motor is not self-starting therefore auxiliary means must be employed to secure an initial starting torque by generating a rotating magnetic field. This is generally done in a way that the main winding, consisting of several coils connected in series, is joined by an auxiliary winding. The alternating fields which are generated by the main and auxiliary windings thus differ in electrical phase and are displaced with regard to space. The difference of phase of the current in the auxiliary winding compared with the current in the main winding is accomplished in the known manner by placing a phase-splitting capacitor in series with one of the windings. The auxiliary winding, the wires of which are essentially thinner than the wires of the main winding, should be energized for a short time only, because it would otherwise burn out due to the intensity of current existing therein.

There has already become known a single-phase motor with the main winding and auxiliary winding being arranged in the stator. Said stator assembly has a plurality of slots, uniformly distributed over the periphery on its inner side, said slots receiving the main winding or windings and an auxiliary winding physically displaced relative thereto in the peripheral direction, and which consists of two short-circuiting rings or coils symmetrically displaced relative to each other. Each of these short-circuited coils encloses a unit of slots and consists of two coil edges which are placed in the two outer slots of the corresponding unit of slots enclosed by said short-circuited ring. Each of these slots also receives one coil edge each of a main winding coil. By coil edge is meant in a single slot, taken as a group.

Most modern motors have distributed windings. That is, the windings, instead of being concentrated in small angular portions of the stator generally designated poles, are spread, more or less uniformly, over the entire internal periphery of the stator. The sides of the coils which make up the windings are normally held in equally spaced slots in the stator. Rather than making the coils truly uniform, they are more usually weighted in a predetermined pattern to more distinctly define poles. Short circuited rings which span several slots are often used to create a rotating magnetic field for starting single phase motors. To ensure a rotating field, the magnetic rings are arranged to form poles which are physically displaced from the main power poles. Thus, the rings forming one starting pole may often overlap the ends of the coils of two main poles. When the main windings are energized with alternating current, circulating currents are induced in the short-circuited rings. These circulating currents, in turn, generate their own magnetic fields which interact with the magnetic fields of the main power windings to produce a resultant rotating magnetic field. (See "Principles of Alternating-Current Machinery," by R. R. Lawrence, published by McGraw-Hill, in 1940, pp. 489–592.)

In order to increase considerably the starting torque of single-phase motors of the said type and to reduce the current density in the short-circuit coils and consequently the heating, it is suggested according to the invention, to provide an optimum number of short-circuit coils and to arrange them in a way that at least one coil side of each coil of the main winding receives in its slot one side of a short-circuit ring. This measure leads to the surprising effect that, compared with the known design, the starting torque is increased by at least 40%.

This effect is due to the fact that the alternating fields which are generated in the main winding and in the short-circuit rings, the phases of which differ in time and are displaced with regard to space, produce an elliptical rotating field that approximates a circular rotating field. Another very essential advantage of the machine relating to the suggested invention lies in the fact that the motor in short-circuited condition can be run without any risk for about 45 minutes.

Moreover, it has proved to be particularly expedient to have the number of turns in the coils of the main windings graduated in a way that the two slot portions of each short-circuit ring coincide with slot portions of coils having different numbers of conductors. Without mentioning that the proposed arrangement and design of the short-circuit rings lead to a counter induction of voltage in the sides of each short-circuit ring which are in the slots, the graduation of the coils has the advantage that different voltages are generated in the two halves of each short-circuit ring. The higher voltage is thus counteracting the lower one. The voltage is therefore leading the current and there is consequently an additional, considerable increase of the phase difference. Another advantage of this double effect lies in the fact that the short-circuit rings form transformers with the coils when the motor is overloaded, and they take up a considerable part of the power being fed to the windings and transform it into heat, that is to say: they act as a load. Due to the large cross section of material the short-circuit coils, are for this reason, more suitable than the wires of the windings.

It can be realized that the amplitude of current in the winding is thus prevented from increasing to a dangerous point when the motor stalls due to overloading. Furthermore, it is possible to reduce the starting peak current considerably, which is particularly important for the connection of the motors to sources of power which are poorly regulated.

The arrangement of the short-circuit rings is particularly advantageous, since considering each symmetrical half—the outer short-circuit ring extends in each case over $N/2$ slots, the following short-circuit ring, however, over the slots $N/2-2n$, this assures the optimum effect with regard to the starting torque. If there are e.g. 18 slots and two short-circuit rings are to be used for each half, the outer short-circuit ring extends over 9 slots, the other over 7 slots ($n=1$).

As another advantage of the invention relating to the single-phase alternating-current motors, there should be mentioned that a simple modification of their winding connections, which can be effected with a change-over switch, allows two pole or four pole operation at will, that is to say: 3000 or 1500 r.p.m. when energized from a 50 cycles-per-second source.

The invention is hereinafter explained by means of an example of a typical design which is schematically illustrated in the drawing.

Figure 1:
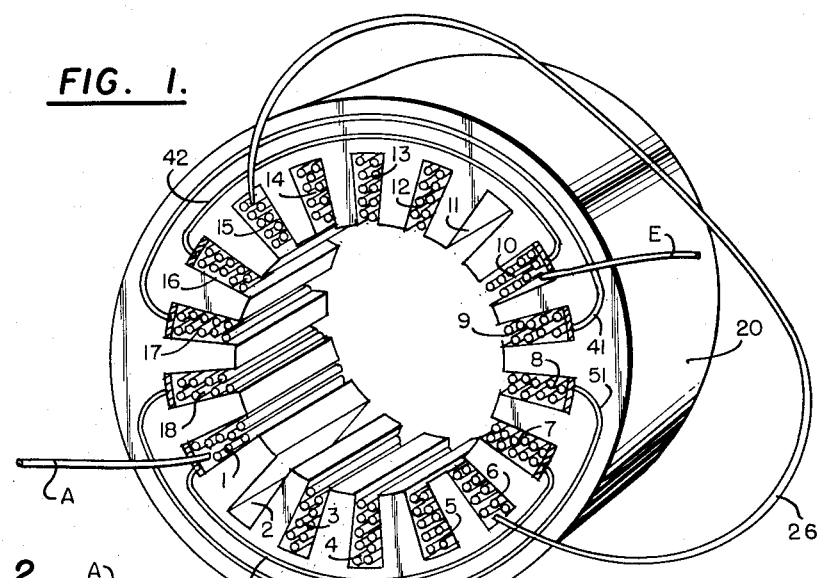
FIG. 1 is a perspective view, partially in section, of a stator core incorporating the principles of this invention.

The stator core 20 has a great number of slots to receive the stator winding, as is known with three-phase alternating-current motors. These slots usually end in narrow slits at the inside of the core through which the wires of the windings are fed. The main winding consists of two windings I and II, each of which have four coils in the example of FIG. 1, 21, 22, 23, 24 and 31, 32, 33, 34 respectively. For the reception of the eight coils there are 18 slots bearing the reference characters 1 to 18, 16 of which are required. A pair of slots 2, 11 lying in the common axial plane of the two windings I and II remains empty. The coils 21, 22, 23, 24 of winding I are contained in slots 7, 8, 9, 10, 12, 13, 14, and 15, and the coils 31, 32, 33 and 34 of winding II are contained in slots 16, 17, 18, 1, 3, 4, 5 and 6. The two windings I and II have associated with them four short-circuit rings 41, 42, 51 and 52 which are made of sheet copper or aluminium. The short-circuit rings are symmetrical in the same way as the coils of the windings, however, they are displaced by four slots (number of coils for each winding for 4-pole operation or one-half the number of coils per winding for 2-pole operation). The angle $\alpha$ of displacement between the windings and the short-circuit rings amounts in the said case to approximately 40°.

Figure 2:
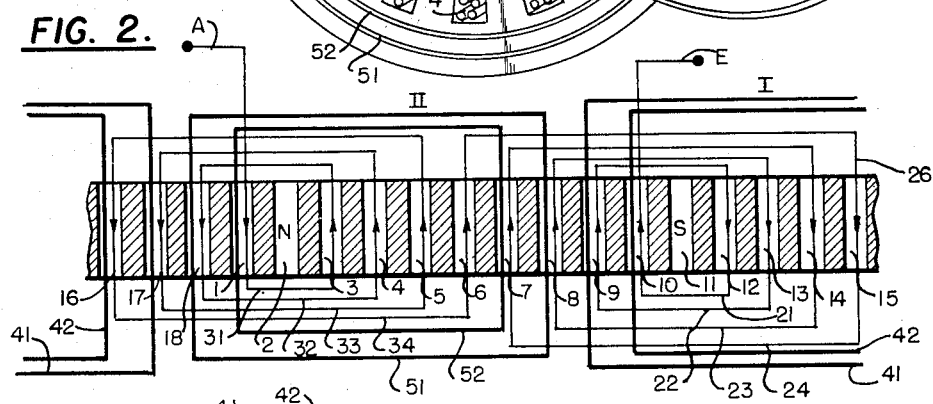
FIG. 2 is a development of the core of FIG. 1 and the connections of the windings therein.

This displacement is more clearly shown in FIG. 2, which illustrates the relative relationships between the main windings I and II and the short-circuited rings 41, 42, 51, and 52. The winding II is symmetrical about slot 2, which can be considered as the north pole for the purposes of this discussion, and the winding I is symmetrical about slot 11 which can be considered the south pole. The two short circuited rings 41 and 42, associated with winding I, are symmetrical about slot 13, and the short circuited rings 51 and 52, associated with winding II, are symmetrical about slot 4. From this, it becomes evident that the poles created by currents flowing in the short-circuited rings 41, 42, 51, and 52 are displaced physically from the poles of the main windings I and II.

Each short-circuit ring passes through one pair of slots, that is to say, they rest on the bottom of the slots, together with the conductors of the main winding disposed therein. The two slot portions of each short-circuit ring which lie flat on the bottom of the slots are connected with each other on the two front faces of the stator core by ring sectors which are disposed thereon.

Figure 3:
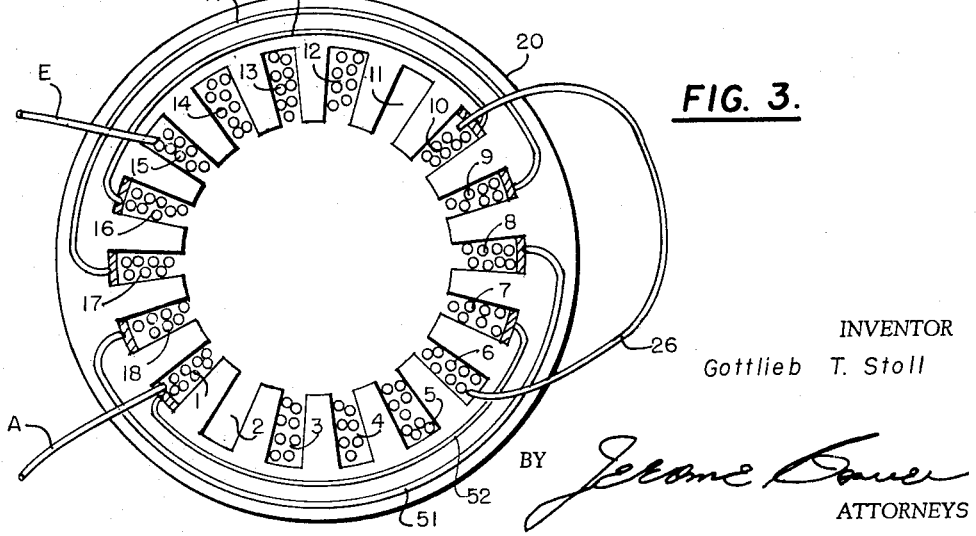
FIG. 3 is an end view, in section, of the stator core of FIG. 1 showing the windings connected for four pole operation.
Figure 4:
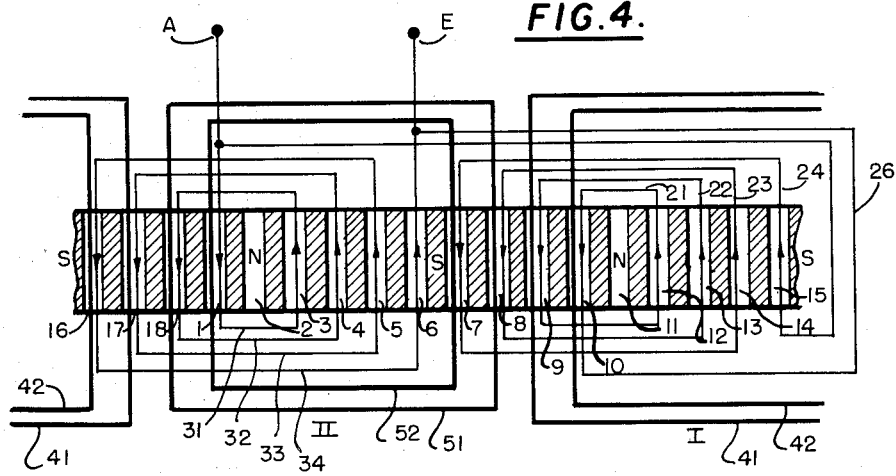
FIG. 4 is a development of the core of FIG. 3 showing the connections of the windings.

The same stator core and windings illustrated in FIGS. 1 and 2 connected for 2-pole operation are illustrated in corresponding FIGS. 3 and 4 connected for 4-pole operation. The four poles may be considered as shown in FIG. 4 where a south pole is shown centered on the tooth between slots 15 and 16, a north pole centered on slot 2, a south pole centered on the tooth between slots 6 and 7, and a north pole centered on slot 11. The short-circuit rings 41 and 42 are symmetrical about slot 4, which can be considered the center of their pole, and the rings 51 and 52 are symmetrical about slot 13. Thus, it can be seen that in 4-pole operation, as well as in two pole operation, there is a physical displacement of about 40° between the poles of the main windings and those of the short-circuit rings.

Due to the displacement of the short-circuit rings relative to the two windings by a number of slots which equal the number of coils of each of the windings, the two slot portions of each short-circuit ring thus coincide with slot portions of coils; each of which corresponds to another one of the two windings. As to the example illustrated, the short-circuit ring 41 includes one of the slot portions of coil 22 of winding I located in slot 9, and the one of the slot portions of coil 33 of winding II located in slot 17. Short-circuit ring 42 is associated with slots 10 and 16 which contain slot portions of the coils 21 and 34; to the short-circuit ring 51 there belong the slots 8 and 18 which contain slot portions of coils 23 and 32, and to the short-circuit ring 52 there belong the slots 7 and 1 which contain slot portions of the coils 24 and 31. The coils of the two windings I and II are, as shown in FIGS. 2 and 4, connected in series. In both cases the beginning A is in the inner coil 31 of winding II (slot 1). In the example of FIG. 2, the outer coil 34 of winding II is connected, by line 26, with the outer coil 24 of winding I, and the end E is led out of the inner coil 21 of winding I (slot 10). This leads to 2 pole operation, the windings I and II forming the two poles together.

In the example of FIG. 4, the outer coil 34 of winding II is connected, by line 26, with the inner coil 21 of winding I, whereas the end A is led out of the outer coil 24 of winding I (slot 15).

Figure 5:
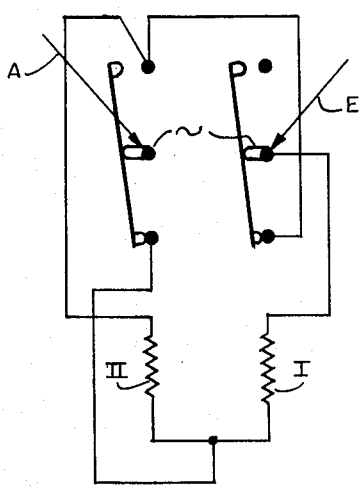
FIGS. 5 and 6 are schematic wiring diagrams of the windings of the motor of FIG. 3 showing their connections for four pole operation.
Figure 7:
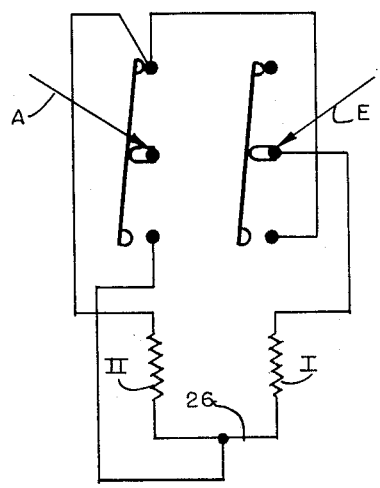
FIGS. 7 and 8 are schematic wiring diagrams of the windings of FIG. 1 showing their connections for two pole operation.
Figure 6:
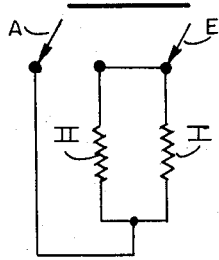
Figure 8:
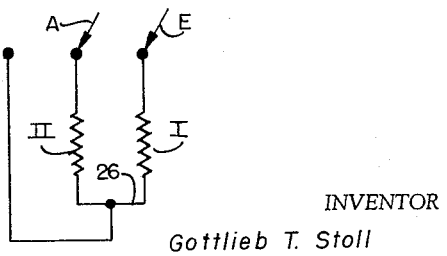

This leads to 4-pole operation; the first pole 1 is associated with the slots 16, 17, 18, 1 with the second pole: the slots 3, 4, 5, 6; the third pole with the slots 7, 8, 9, 10; and to the fourth pole with the slots 12, 13, 14, 15. The 2- and 4-pole operation can be easily combined in one change-over switch in order to change the motor from 2-pole operation over to 4-pole operation by simple actuation of a switch. The switch and the manner in which it is connected to the windings to accomplish the 2- or 4-pole operation is illustrated in FIGS. 5, 6, 7, and 8. FIGS. 5 and 6 show the connections for 4-pole operation, and FIGS. 7 and 8 show the connections for 2-pole operation.

The different coils of the two windings I and II have graduated numbers of turns. In the examples illustrated the two inner coils 21 and 31 have the smallest number of turns, and the two outer coils 24 and 34 have the largest number. The various numbers of turns are indicated in FIG. 3 by the number of plus or zero symbols for the coil wires which are provided in the different slots while in FIG. 1, different numbers of wires are shown. The two slot portions of each short-circuit ring coincide with coil sides having different numbers of wires. The short-circuit ring 42 which is included within slots 10 and 16 lies on one side in slot 10 together with a slot portion of the inner coil 21 which has the smallest number of turns of winding I, and on the other side in slot 16 together with a slot portion of the outer coil 34 which has the greatest number of turns of winding II. On the other hand, the short-circuit ring 52, being symmetrically arranged with respect to short-circuit ring 42, has included within slot 7 a slot portion of coil 24 having the greatest number of turns of winding I, and in slot 1 a slot portion of coil 31 having the lowest number of turns of winding II. The short-circuit rings 41 and 51 which are contained in the slot pairs 9, 17 and 8, 18 coincide with slot portions of coils which belong to different windings and differ as to the number of turns. The short-circuit rings have thus induced in their two slot portions different voltages.

The favorable effects which have been explained here are therefore obtained with regard to starting torque and overload capacity of the motor.

For each of the two windings I and II there is preferably provided an even number of coils as is shown in the examples of FIGS. 1-4 because it is then assured that the two slot portions of all the short-circuit rings coincide with slot portions of coils having different numbers of turns. With odd numbers of coils for each winding one can not avoid the coincidence of two slot portions of a short-circuit ring with slot portions of coils having the same number of turns, so that the double voltage effect would not be possible for one short-circuit ring.

I claim:
1. A single phase motor comprising a rotor, a stator surrounding the rotor, said stator having on its inner side a plurality of slots substantially uniformly distributed over its periphery, at least one main winding consisting of a plurality of coils distributed among said slots, and an auxiliary winding comprising a plurality of individual auxiliary coils, said auxiliary coils when energized forming auxiliary magnetic poles displaced in a peripheral direction from the main magnetic poles formed when said main windings are energized, said auxiliary winding consisting of a plurality of short-circuited coils or rings symmetrically displaced relative to the axis of the main winding, adjacent short-circuited coils encompassing differing numbers of said slots.

2. A single phase motor as in claim 1 in which the auxiliary winding consists of a number of short-circuited rings which are arranged such that at least one coil side of each coil of the main winding is located in a slot which contains one side of a short-circuited ring.

3. A single phase motor as in claim 1 in which the number of turns of the coils of the main windings are graduated so that the two slotted portions of each short-circuited ring coincide with slotted portions of coils having a different number of inductors, whereby different magnitudes of voltage are induced on each side of said short-circuited ring.

4. A single phase motor as in claim 1 in which the symmetrical axis of the short-circuited rings is physically displaced relative to the main winding field axis by approximately 45°.

5. A single phase induction motor comprising a stator having an even number of coil slots formed in its inner surface, an even number of distributed main power windings mounted on said stator, each of said power windings being formed of coils having opposite coil sides in spaced slots, means for energizing said windings from a source of alternating electrical energy, said winding creating an even number of magnetic power poles when energized, and means for creating auxiliary magnetic poles electrically and spacially displaced from said power poles, said means comprising a plurality of pairs of short-circuited rings, said rings having opposite sides supported in spaced slots of said stator adjacent sides of the coils forming the main power windings, said rings being energized by induction from said main power windings, each pair of rings being concentric to form a pole when energized, the number of auxiliary poles so formed being dependent upon the number of main power poles present.

6. A single phase induction motor having a stator formed of magnetic material, said stator having an even number of substantially equally spaced coil slots formed in its inner surface, adjacent slots being separated by pole teeth formed thereby, a plurality of main power coils supported on said stator, said power coils each having opposite sides positioned in spaced slots, said coils being interconnected to form an even number of distributed power windings, each power winding creating when energized a first magnetic pole, and an even number of sets of short-circuited rings forming auxiliary windings, each set of short-circuited rings comprising a plurality of individual short-circuited rings centering upon the same coil slot, the rings having opposite sides in spaced slots together with coil sides of said main power coils, each ring of a set spanning a number of pole teeth different from the number spanned by the other rings of the set, each set of short-circuited rings being inductively energized by the energized power windings to create a magnetic pole spaced from the closest magnetic pole created by the power windings.

7. A single phase induction motor having a stator formed of magnetic material, said stator having an even number of substantially equally spaced coil slots formed in its inner surface, adjacent slots being separated by pole teeth formed thereby, a plurality of main power coils having varying numbers of turns supported on said stator, said power coils each having opposite sides positioned in spaced slots, said coils being interconnected to form an even number of distributed power windings, each power winding creating when energized a first magnetic pole, and an even number of sets of short-circuited rings forming auxiliary windings, each set of rings comprising strips of electrical conductive material positioned in the bottoms of spaced slots together with sides of said power coils, said individual strips being connected to form sets of short-circuited rings centering upon the same slot, said individual rings of a set spanning different numbers of slots, the strips of a single ring being positioned in slots containing power coil sides with different numbers of turns, said rings being inductively energized by energized power windings to create magnetic poles spaced from those created by said main power windings.

References Cited in the file of this patent
UNITED STATES PATENTS

| 1,269,152 | Becker | June 11, 1918 |
| 2,235,075 | Kimball | Mar. 18, 1941 |